(12) United States Patent
Bareket

(10) Patent No.: US 7,932,338 B2
(45) Date of Patent: Apr. 26, 2011

(54) BROMINATED POLYMERS, AND FIRE RETARDANT ARTICLES COMPRISING THEM

(75) Inventor: Yifat Bareket, Reut (IL)

(73) Assignees: Bromine Compounds Ltd., Beer Sheba (IL); B.G. Polymers A.C.A. Ltd., Kibbutz Bet Govrin (IL)

( * ) Notice: Subject to any disclaimer, the term of this patent is extended or adjusted under 35 U.S.C. 154(b) by 1105 days.

(21) Appl. No.: 10/587,242

(22) PCT Filed: Jan. 25, 2005

(86) PCT No.: PCT/IL2005/000088
§ 371 (c)(1),
(2), (4) Date: Feb. 7, 2007

(87) PCT Pub. No.: WO2005/070980
PCT Pub. Date: Aug. 4, 2005

(65) Prior Publication Data
US 2007/0167550 A1 Jul. 19, 2007

Related U.S. Application Data

(60) Provisional application No. 60/539,101, filed on Jan. 27, 2004.

(51) Int. Cl.
*C08F 20/00* (2006.01)
(52) U.S. Cl. .................................................. 526/303.1
(58) Field of Classification Search ................ 526/303.1
See application file for complete search history.

(56) References Cited

U.S. PATENT DOCUMENTS

| 4,119,612 | A | 10/1978 | Vollkommer et al. |
| 4,128,709 | A | 12/1978 | Vollkommer et al. |
| 4,412,051 | A | 10/1983 | De Man et al. |
| 4,728,463 | A | 3/1988 | Sutker et al. |
| 5,072,028 | A | 12/1991 | Fishler et al. |
| 5,276,091 | A | 1/1994 | Rinehart et al. |
| 5,290,636 | A | 3/1994 | Rose et al. |
| 6,218,074 | B1 | 4/2001 | Dueber et al. |
| 2002/0024042 | A1 | 2/2002 | Friedman et al. |

FOREIGN PATENT DOCUMENTS

| EP | 1 164 124 A2 | 12/2001 |
| FR | 2316254 | 1/1977 |
| FR | 2323714 | 8/1977 |
| GB | 2 018 750 A | 10/1979 |
| JP | 51-135997 A | 11/1976 |
| JP | 52-3682 A | 1/1977 |
| JP | 54-138531 A | 10/1979 |
| JP | 10-254132 A | 9/1998 |
| JP | 2000-9901 A | 1/2000 |

OTHER PUBLICATIONS

"Industrial & Specialty Monomers" by San Esters Corporation, New York, NY.
"Industrial & Specialty Monomers" by San Esters Corporation, New York, NY, (2008).

*Primary Examiner* — Edward J Cain
(74) *Attorney, Agent, or Firm* — The Nath Law Group; Susanne M. Hopkins; Ari G. Zytcer

(57) ABSTRACT

The present invention provides a polymer, an aqueous suspension of a polymer, methods for obtaining them, and fire-retardant products comprising a polymer and antimony oxide. The polymer of the invention is made of (i) at least one non-brominated monomer and (ii) at least one brominated monomer having the structure A-B-C, wherein A is a phenyl, substituted with 3-5 bromine atoms, B is a C1 to C4 alkyl, optionally substituted with 1 to 8 bromine atoms, and C is an acrylic or methacrylic group. An example of a suitable brominated monomer is penta bromo methyl acrylate. Preferable polymers have at least 20% w/w bromine. Preferable aqueous suspensions have at least 40% solid content. Fire-retardant products according to the invention comprise a polymer made of at least one bromine-containing monomer and at least one non-brominated monomer. Preferable fire-retardant products include polymers according to the invention.

48 Claims, No Drawings

BROMINATED POLYMERS, AND FIRE RETARDANT ARTICLES COMPRISING THEM

CROSS-REFERENCE

This is a National Phase Application filed under 35 U.S.C. 371 of International Application No. PCT/IL2005/000088, filed on Jan. 25, 2005, claiming the benefit under 35 USC 119(e) of U.S. Provisional Patent Application No. 60/539,101, filed on Jan. 27, 2004, the entire content of each of which is hereby incorporated by reference in its entirety.

FIELD OF THE INVENTION

This invention relates to brominated polymers, dispersions thereof, and uses of such polymers and dispersions.

BACKGROUND OF THE INVENTION

It is known in the art to include bromine-containing additives in articles such as fabrics, coatings, and adhesives, in order to render them fire-retardant. If such additives are of small molecular weight, and not chemically bond to the matrix, they might diffuse out of the product (especially if the product is frequently washed, like in the case of fabrics), and fire retardancy decreases. Furthermore, the drainage of manufacturers and users of such products may contain brominated additives, which might cause environmental problems.

One object of the present invention is to provide novel brominated substances that may be used as additives for rendering an article fire retardant. Other objects will be made clear to the reader from the following description and claims.

RELATED ART

The following publications may be helpful in understanding the background of the invention. An appearance of a publication under this title, however, should not be construed as applying that the publication is relevant to the patentability of the invention.
1. US patent application publication no. 2002/24042, describing dispersions and terpolymers of PBBMA;
2. U.S. Pat. No. 5,072,028, describing a process for the preparation of PBBMA and related compounds;
3. U.S. Pat. No. 4,728,463, describing brominated styrene-maleate copolymers;
4. U.S. Pat. No. 4,412,051, describing fire resistant copolymers of bromostyrene and another monomer, preferably, acrylonitrile;
5. U.S. Pat. No. 5,290,636 describing flame retardant latex coatings, which comprise copolymers of ring-halogenated aromatic monomer units, alkyl acrylate/methacrylate monomer units, and optionally another monomer unit; and
6. U.S. Pat. No. 5,276,091 describing polymeric compositions wherein a base polymer is blended with a stable interpolymer prepared by compolymerizing a brominated monovinyl aromatic monomer, a methacrylic acid ester and, optionally, an ethlenically unsaturated nitrile.

SUMMARY OF THE INVENTION

The present invention provides a copolymer made of at least one bromine-containing monomer, and at least one other monomer. Bromine containing monomers included in the copolymer of the invention are of the formula A-B-C wherein A is a phenyl, substituted with 3-5 bromine atoms, B is a $C_1$-$C_4$ alkyl, optionally substituted with 1-8 bromine atoms, and C is an acrylic or methacrylic group. The copolymer of the invention is characterized in having bromine contents of at least 20%. All the concentrations expressed herein by % refer to w/w percentage, unless otherwise is indicated.

The group A defined above may be substituted with 3, 4, or 5 bromine atoms, where 5 is most preferable. Independently, the group B is a lower alkyl, which may have 1, 2, 3, or 4 carbon atoms, each of which may independently have none, 1, or 2 bromine substituents.

Some examples for brominated monomers in accordance with the present invention are tri, tetra, and penta bromo benzyl acrylate, tri, tetra, and penta bromo benzyl methacrylate, tri, tetra, and penta bromo phenyl ethyl (meth)acrylate, tri, tetra, and penta bromo phenyl mono-, di-, tri-, or tetra-bromo ethyl (meth)acrylate, tri, tetra, and penta bromo phenyl mono-, di-, tri-, tetra-, penta-, or hexa-bromo propyl (meth) acrylate, and tri-, tetra-, or penta-bromo phenyl mono-, di-, tri-, tetra-, penta-, hexa-, septa-, or octa-bromo butyl (meth) acrylate. Penta bromo benzyl acrylate will be referred to hereinafter as PBBMA.

The polymer of the invention includes monomers of at least two different structures, and therefore, may also be named copolymer. Thus, the terms polymer and copolymer are used herein interchangeably.

According to one embodiment the polymer of the invention has bromine contents of 60-70%, according to another embodiment the bromine contents is between 25 and 50%, and according to another embodiment 20-35%. Polymers of different bromine percentage may be useful for different applications and corresponding flame retardancy (FR) standards.

Additionally to the bromine containing monomer, a polymer according to the present invention has at least one non-brominated monomer, which may be a specialty monomer, or a non-specialty monomer.

Non-limiting examples of functions that may be attributed to specialty monomers include cross-linking, surface active, or adhesion promoting. In some cases, a single specialty monomer may have more than one function, for instance, N-methylol acryl amide functions both as a surfactant and as an adhesion promoter, which improves the adhesion of the polymer to textiles. Non-limiting examples of specialty monomers that may be used according to the invention are sodium salt of 2-acrylamido-2-methyl propane sulphonic acid, betal-carboxymethyl acrylate, ammonium allyloxy-polyethoxy(10)sulphate, laurethoxy(23)methacrylate, laurethoxy(25)methacrylate, allyl methacrylate, hydroxyl ethyl methacrylate, glycidyl methacrylate, ammonium salt of α-sulfo-ω-[1-(Alkoxy)methyl-2-(2-propenyloxy)ethoxy]-ω-hydro-poly(oxy-1,2,-ethanediyl), ammonium salt of α-[1-(Alkoxy)methyl-2-(2-propenyloxy)ethoxy]-ω-hydro-poly (oxy-1,2,-ethanediyl), Ditrimethylolpropane tetraacrylate, Ethoxylated trimethylolpropane triacrylate, and Trimethylolpropane triacrylate. Such specialty monomers are sold under trade names such as AMPS2405 (manufactured by Lubrizol), Beta C, DVP-010, Lem 23, Lem25 (all by Bimax Inc.), HEMA (by Laporte), Akeda Reasope SR-10, Akeda Reasope SR-20, Akeda Reasope SR-30, all by Asahi Denka, and SR355, SR454, SR351 (all by Cray Vally).

Non-limiting examples of non-specialty monomers that may be used according to the present invention are acrylic monomers, vinyl acetate, styrene, and styrene derivatives such as α-alkyl styrene, and particularly α-methyl styrene.

Preferable acrylic monomers are acrylamide, acrylic acid, methacrylic acid, acrylonitrile, butyl acrylate, ethyl acrylate, 2-ethyl hexyl acrylate, and methyl methacrylate.

A polymer according to the invention is typically made of between two and six different monomers. When very high bromine content is desirable, the non-brominated monomers are typically specialty monomers.

A specific group of monomers useful according to the present invention are of acrylic structure, namely, monomers of the formula $R_1CH=CR_2C(O)A$, wherein A is selected from the group consisting of $OR_3$, $NR_3R_4$, and CN; and $R_1$, $R_2$, are each independently selected from H or alkyl, said alkyl being linear or branched, and each of $R_3$ and $R_4$ independently may be H, alkyl, alkenyl, alkoxy, polyalkoxy, alkanol, or ether, each of which may be linear or branched, substituted or unsubstituted. As may be apparent from the examples given below, the carbon-containing R groups (namely, those groups of $R_1$, $R_2$, $R_3$, and $R_4$ that contain carbon) have usually between 1 and 15 carbons, although some of them may at times contain more carbon atoms. The alkyl R groups are typically of 1-4 carbon atoms.

Among the above mentioned acrylic monomers, those with $R_3$ or $R_4$ other than alkyl are typically specialty monomers.

According to another aspect of the present invention, there is provided an aqueous polymeric dispersion of a bromine-containing polymer, wherein the solid content in said dispersion is at least 40%, typically 40-65%, most typically 40-55%.

The term dispersion is used herein to refer to solid particles dispersed in liquid medium. In a dispersion, the particles do not agglomerate, at least on a time scale of practical interest, and this is usually achieved by including therein suitable surface active agents. According to the invention, two or more surface active agents are usually required.

Surface active agents, surfactants, emulsifiers, and dispersants, are all terms that are used herein interchangeably.

It should be noted that it is preferable to use such surfactants that are useful in all the stages of the polymerizing procedure, starting with stabilizing a dispersion of the brominated monomer, through stabilizing pre emulsion or pre dispersion and allowing efficient polymerization reaction between the different monomers, and ending with stabilizing the polymeric aqueous dispersion obtained eventually. This complicated task is usually accomplished in accordance with the present invention by two or more surfactants. Surfactants that were found by the inventor to be most suitable according to the present invention are nonionic and/or anionic surfactants. Among the nonionic surfactants, alkyl phenol based surfactants are particularly useful. It should be noted, that some countries tend to limit the use of alkyl phenols, since these compounds are suspected as being non-friendly to the environment and to human health. Therefore, substitutes to alkyl phenols are being developed, and such substitutes are expected to be also very useful in accordance with the present invention.

Of the anionic surfactants, of most particular interest are alkyl aryl based, such as alkyl aryl sulphonic acid or alkyl aryl sulphonate.

Non-limiting examples to liquid mediums in which a brominated copolymer may be dispersed in accordance with the present invention are water, glycols, and mixtures thereof.

Preferably, the bromine-containing polymer, which is dispersed in the dispersion of the invention, has a bromine content of at least 20% (w/w), and is in accordance with the first aspect of the invention, as described above.

Typically, the aqueous polymeric dispersion has a high density (comparing to commercial acrylic polymers), of above 1.2 g/cc, usually between 1.2 and 1.7 gr/cc, which makes it difficult to stabilize its aqueous dispersion. The dispersion is stabilized by surfactants, and usually by a combination of two or more surfactants, each of which may be reactive (i.e. become part of the polymer chain) and/or non-reactive (i.e. remain as independent substance in the dispersion).

Preferable aqueous polymeric dispersions according to the invention have a particle size of 2000 nm and smaller, preferably between 50 and 1000 nm, more preferably between 80 and 400 nm. Typically, the molecular weight of polymers according to the invention is 500,000 and above, preferably above 1,000,000.

Polymeric aqueous dispersions according to the invention proved to be stable for at least six months at 5-35° C. without direct sunlight. Conventional additives, such as propylene glycol may extend this temperature range to about −70°-+35° C.

According to another aspect thereof, the present invention provides fire-retardant products comprising a bromine-containing polymer together with antimony-oxide (hereinafter AO). The AO is usually added to the aqueous polymeric dispersions in methods known in the art per se, namely, as commercially available dispersion, added to the final dispersion after its stabilization. Nevertheless, the invention also encompasses products and dispersions that include AO, which was added in other manners. One non-limiting example for such products is a dispersion wherein the AO is added during polymerization stage, as demonstrated in Example 12 below. Preferably, the bromine-containing polymer, dispersed in the dispersion that renders the products of the invention fire retardant, has a bromine contents of at least 20% (w/w) and is by itself in accordance with the first aspect of the present invention.

In the context of the present application and claims a product is considered fire retardant if it meets international standards, such as standard CFR16/1615 for fabrics, standard-ASTM D3806 for paints, and standard ASTM D2859, BS 476-7, DIN 4102-1, ISO1182 for building materials.

Non-limiting examples to products according to the invention are textiles, non-woven fabrics, paints, coatings, and adhesives.

In case of textiles according to the invention, polymers of the invention may be applied thereto mainly by means of topical application of a dispersion according to the invention or impregnation of such dispersion into the treated textile. Methods for topical application include, for instance, spraying, padding, or printing. Since these methods (including impregnation are commonly used in the textile industry, the present invention does not require any unique production line dedicated to the treatment of the textiles to make them fire retardant.

Another advantage that may be associated with the use of textiles according to the invention is that the drainage of the manufacturing facility as well as that of the users does not contain free bromine compounds.

Many textiles are designed to be hydrophobic, in order to retain their color strength, to allow them to remain stain free, and to eliminate water penetration through the textile. The present invention is suitable for such applications, especially if a polymer with a non-brominated hydrophobic monomer is used. Non-limiting examples of monomers to be used for obtaining a hydrophobic fire retardant textile according to the invention are butyl Acrylate, 2-ethyl hexyl acrylate, and styrene.

Typically, polymers in accordance with the invention have Tg of between −20° C. and 70° C. It is interesting to note that according to the invention it is also possible to obtain polymers with Tg lower than 0° C. This may be achieved by using polymers with non-brominated monomers having a low Tg, of typically lower than 0° C., which results in a soft hand fire retardant textile that is out of reach of most state of the art methods. Non-limiting examples of monomers with Tg lower than 0° C. are butyl Acrylate, ethyl Acrylate, and 2-ethyl hexyl acrylate. Another advantage that may be associated with textiles that are made fire retardant in accordance with the present invention is that they remain transparent without affecting the final color of the textile. However, such transparency is typically obtained only in such textiles that were treated with dispersions according to the invention that had a particle size of between about 100 and about 350 nm.

Similar advantages may be obtained also by applying the dispersion or polymer of the invention to non-woven fabrics. Furthermore, in case of non-woven materials, these may be made by the chemical bond method, in which case, a polymer in accordance with the present invention may be used for chemically bonding fibers of the non-woven fabric and at the same time rendering said fabric fire-retardant.

Naturally, non-woven fabrics may also be made fire retardant by topically applying to them a dispersion according to the invention, for example, by printing, spraying, and the like, or by impregnation.

Non-woven articles may frequently benefit from having a soft, non-fragile structure. This may be obtained with polymers of the invention, wherein the non-brominated monomer is of a low Tg, preferably, lower than 0° C. Non-limiting examples to such monomers are butyl acrylate, ethyl acrylate, and 2-ethyl hexyl acrylate.

Regarding to paints, coatings and adhesives, since these are typically water-based acrylics, the dispersion of the present invention may easily be made compatible with such products, do not shorten their shelf life, neither adversely affects their effectiveness.

According to another of its aspects, the present invention provides a method for obtaining an aqueous dispersion of a co-polymer containing at least a first monomer and a second monomer, wherein said second monomer is at least partially dissolved in said first monomer, and reacts to polymerize therewith in the presence of water surfactants; the method being characterized in that the first monomer is a brominated aromatic compound.

Preferences for the first monomer in accordance with this aspect of the invention are the same as for the brominated monomer in accordance with the other aspects of the invention.

The second monomer is preferably styrene or a derivative thereof, such as α-alkyl stryerne.

According to one embodiment, the method comprising:
(i) dissolving said first monomer in a first liquid to obtain a solution, wherein said first liquid includes said second monomer optionally together with surfactants;
(ii) mixing said solution with water and optionally also with surfactants to obtain a stable emulsion comprising water, surfactants, and said first monomer; and
(iii) reacting said stable emulsion with an initiator to obtain an aqueous dispersion of a polymer containing at least said first monomer and said second monomer.

According to one embodiment, the first liquid does not include surfactants, and these are added only in (ii). Preferably, this method of the invention is utilized to obtain an aqueous polymeric dispersion in accordance with the invention (i.e. at least 40% solid content, etc.), and the polymer dispersed therein is also in accordance with the invention (at least 20% bromine content, etc.)

One embodiment of particular interest is where at least one of the surfactants is reactive, and the obtained polymer contains it in the polymeric chain.

Another embodiment of particular interest is a method as described herein, wherein the first and second monomers react with at least one other monomer, such that the polymer obtained by the method is a copolymer of the first monomer, the second monomer, and this at least one other monomer. All non-brominated monomers mentioned in relation to the other aspects of the invention may be useful in this embodiment.

It should be noted that the solution of the first monomer dissolved in the second monomer is not necessarily clear, and may include non-dissolved particles of the first monomer. However, usually, the solution is prepared to appear clear to the naked eye.

According to another aspect of the present invention there is provided a method for obtaining an aqueous polymeric dispersion having a polymeric particles of a first size, by reacting a dispersion of monomers having particles of a second size, wherein said second size is larger than said first size, comprising: reacting said dispersion with a mixture comprising said other monomers, and stirring the reaction mixture at about 200-300 rpm and adding reactive substances to the mixture at a rate of between 1 and 10 ml per minute, while keeping the temperature at about 70-90° C.

DETAILED DESCRIPTION OF THE INVENTION

In order to understand the invention and to see how it may be carried out in practice, several exemplary embodiments will now be described, by way of non-limiting example only. In all these examples, the order of adding the various ingredients may be of crucial importance.

In particular, presented here is a list of substances that were used by the inventor for carrying out the invention in accordance with the following examples. The invention is not limited to the substances listed herein, however, they should suffice for carrying out the following examples.

In this regard, it should be noted that some of the surfactants listed below are commercially available when they are water-diluted. In other cases, the user should dilute them in water before use. When the inventor diluted a surfactant from the list below in order to use it in accordance with the invention, the used dilution is mentioned in the list. Amounts mentioned in the Examples below are always of diluted surfactants.

List of Useful Substances

General
PBBMA—pentabromo benzyl acrylate. (FR-1025M. Dead Sea Bromine Group).
APS—Ammonium Per Sulphate—(Degussa, Caldig, Stan Chem)
Formosul—Sodium Formaldehyde Solphoxylate dihydrate (Stan, Transpek-silox)
TBHP—tert-Butylhydroperoxide 70% (Peroxide Chemie, Witco)
Nyacole 1550—Antimony pent oxide dispersion. (Nyacol Nono)
Nyacole 1540N—Antimony pent oxide dispersion. (Nyacol Nono)
Nyacole 1550PH7—Antimony pent oxide dispersion. (Nyacol Nono)

Surface Active agents: Aerosol OT75—Sodium Dioctyl sulphosuccinate in ethanol/water (Cytec)
NP6—Nonyl Phenol+6 Ethylene oxide (Sasol)
NP9—Nonyl Phenol+9 Ethylene oxide (Sasol)
Synperonic NP10—Nonyl Phenol+10 units of Ethylene oxide (Uniqema)
Synperonic NP12—Nonyl Phenol+12 units of Ethylene oxide (Uniqema)
Synperonic NP10—Nonyl Phenol+10 units of Ethylene oxide (Uniqema)
Synperonic NP17—Nonyl Phenol+17 units of Ethylene oxide (Uniqema)
NP20—Nonyl Phenol+20 units of Ethylene oxide (Sasol)
NP30—Nonyl Phenol+30 units of Ethylene oxide (Sasol)
Synperonic NP40—Nonyl Phenol+40 units of Ethylene oxide (Uniqema)
Otix40—Octyl phenol ethoxylate (Condea)
Emulgaten CO 55—Alkyl polyglycol ether (Condea)
Emulgante AS25—Alkyl polyglycol ether (Condea)
Byk190—Sol. Of a polyfunctional polymer with anionic/nonionic character (Byk chemia)
Byk 380—Dipropylene glycolmethyl ether (Byk chemia)
Byk 154—Ammonium acrylate copolymer (Byk chemia)
Zoropol SLS—Sodium lauryl sulfate (Zohar detergent Factory)
Zoropol AN—Ammonium nonoxynol 9 sulphate (Zohar detergent Factory)
Labs60—Sodium Alkylbenzene sulfonate (Zohar detergent Factory)
Labs100—Dodecylbenzene sulphonic acid (Zohar detergent Factory)
Solsperse 44000—(Avecia)
Ethylan Co-55—Cethyl-Oleyl Alcohol Ethoxylate (Akcros)
Imbentin U60—Branch oxo alcohol C11+6 ethylene oxide (Dr. Kolb)
Lutensol AT80—Fatty alcohol ethoxylated. (BASF)
Antifoam:
Antifoam—Blend of hydrocarbon & nonionic (Stockhausen)
Foamaster 3082—fatty acid ester and salts in hydrocarbons alkylate (Nymco)
Darpo 2162—(Elementis)
Moussex 3029 HL—(Synthron)
Foamaster 50—(Cognis)
Special Monomers:
N-Methylol Acryl amide—N-(Hydroxymethyl)Acrylamide (our synthesis product)
Glycidyl Methacrylate—(Dow)
AMPS2405—2-acrylamido-2-methyl propane sulphonic acid, sodium salt (Lubrizol)
Beta C—Beta-carboxyethyl acrylate (Bimax)
DVP-010—Ammonium allyloxypolyethoxy(10) Sulfate (Bimax inc.)
Lem 23—Laurylethoxy (23) methacrylate (Bimax)
Lem 25—Laurylethoxy (25) methacrylate (Bimax)
Allyl Methacrylate—(Shinwa trading)
HEMA—Hydroxy ethyl methacrylate (Laporte)
ADEKA Reasoap SR-10—(Asahi Denka)
ADEKA Reasoap E20—(Asahi Denka)
ADEKA Reasoap ER30—(Asahi Denka)
Mono&Di&Tri&Highly functional monomer and oligomer acrylate (Cray Valley)
Marlon AS—Alkylbenzene sulphonic acid (Condea)
Marlon A—Alkylbenzene sulphonate sodium salt (Condea)
DISPONIL FES 32—Fatty alcohol poly glycole ether sulphate, sodium salt
Disponil AES 72—Alkyl Aryl Polyglycole ether Sulphate sodium salt
Biocides:
Acticide SPX—5-chloro-2-methyl-2H-isothiazol-3-one+methyl-2H-isothiazol-3-one (THOR).
Acticide GR—2,2',2"-(hexahydro-1,3,5-triazine-1,3,5-triyl) triethanol (THOR) (May be Mergal KM200 of Troy).
Acticide MBS—Combination of 1,2-benzisothiazol-3(2H)-one+2-methyl-2H-isothiazol-3-one (THOR)
Acticide FS—methylisothiazolones and Formaldehyde donors(THOR)
Nipacide OPG—N-octylisothiazolinone (Nipa Labratories)
Rheological Modifiers:
Carbopol 846—(BFGoodrich)
Prox AM162—Aqueous emulsion of an acrylic copolymer (Synthron)
Commercial Monomers:
Acrylamide—(Cytecs, Stan Chem)
Acrylic Acid—(Atochem)
Acrylonitrile—(DSM)
Butyl Acrylate—(Rohm&Haas, Basf, Atochem)
Ethyl Acrylate—(Rohm&Haas, Basf, Atochem)
2-Ethyl Hexyl Acrylate—(Hoechst, Nippon, Basf)
Methyl Methacrylate—(Deggusa, Basf, Atochem)
Styrene—(Gadot)

EXAMPLES

In all the following examples, where addition of AO is not described, it may be added to the final dispersion with short mixing.

Example 1

This example shows how to obtain a copolymer of PBBMA, acrylic acid, N-methylol acryl amide, acrylo nitrile, butyl acrylate, and methyl methacrylate. Such a copolymer was obtained according to this example, and was found to include 32% (w/w) bromine. The aqueous solution obtained in accordance with this example had a 45% solids content with typical particle size of 475 nm and viscosity of 3580 cps (Brookfield, LVT, spindle 3, 12 rpm).

In this example the aqueous polymeric dispersion is obtained from a PBBMA dispersion and an emulsion of the other monomers. Monomers and polymerizing agents are fed simultaneously.

Preparation of the PBBMA dispersion: To a 2-liter round bottom flask, fitted with mechanical stirrer, add 450 gr water and about 150-200 gr of diluted dispersing agents. The dispersing agents should be a combination of an anionic surfactant and a non-ionic surfactant in weight ratio of 1:1. The non-ionic surfactant is to be an alkyl phenol based dispersing agent with a Low HLB, of about 7-11.

After short mixing an emulsion is obtained. Add slowly to the emulsion, 400 gr of commercial PBBMA powder (FR1025M, average particle size of 5-8 micron), and 1 gr biocide (in this order). The obtained dispersion should then be mixed for another 10 minutes.

Grind the dispersion until the particle size is about 600-1500 nm. This may be done with High Sheer Homogenizer, such as IKA Ultraturax T-50, operated for about 20 minutes followed by additional 3 cycles of grinding process with pearl mill such as Dyno mill, to obtain the required size. All grinding should be carried out while temperature is observed not to raise over 30° C. After grinding, PH should be adjusted to 7-8.

Pre-emulsion: To a 1 liter round bottom flask, fitted with mechanical stirrer, add about 70 gr water and 3-8 gr of anionic surfactant. After 5-10 min stirring at about 250 rpm, add slowly, one by one, and with continuous stirring, the following ingredients: 2-6 gr acrylic acid, 15-40 gr N-methylol acryl amide (45% solids), 15-30 gr acrylonitrile, 80-110 gr butyl acrylate, 40-70 gr methyl methacrylate and about 15 gr water. The obtained pre emulsion should be mixed for another 15 minutes.

Polymerization process: To a 1.7 liter, 5-neck, round bottom flask, with warming/cooling double glassing jacket, fitted with mechanical stirrer, reflux condenser, thermometer, 2 dropping funnels and Nitrogen inlet, add about 120 gr water, 0.5 gr sodium bicarbonate and 0.5 gr sodium carbonate. Hot water should be passed through the jacket, to warm the solution up to 80-82° C. Continuous stirring (200-300 rpm) should be applied. Nitrogen is to be introduced under the surface of the liquid for about 10 min. First initiator solution, made by dissolving 0.5 gr APS in 5 gr water, is then added. 5 min later, 10-20 gr of the pre-emulsion described above is to be added. Few minutes later, when no change in Temp is observe, the rest of pre emulsion is to be slowly added through one dropping funnel (this should take about 3.5 hours). 500 gr of the PBBMA dispersion described above should then be added, through the second dropping funnel, drop wise. This takes about 1.5 hours. A main initiator solution, prepared by dissolving 1.8-3 gr APS and 1 gr ammonia in 40 gr water is added through a separate dropping funnel, during both pre emulsion and dispersion addition. Temperature should be kept at 80-82° C. during the entire procedure. About 4 hours from the beginning of the polymerization, raise the temperature to 85° C., and stir the dispersion obtained for another 45-55 min. Lower the temperature to 65° C., and add a solution of 1.4 gr TBHP in 4 gr water. After 5 min, add a solution of 0.9 gr Formosul in 8 gr water, cool the dispersion to room temperature, and add 2 gr Ammonia, 10-20 gr of dispersing agent and about 3 gr biocide with constant stirring. The dispersing agent should be of the alkyl phenol type, with HLB value of between about 13.

Example 2

In this example, obtained is a copolymer of PBBMA, acrylic acid, N-methylol acryl amide, and butyl acrylate. Aqueous dispersions obtained in accordance with this examples had about 46-47% solid content, where the solids are 32% bromine. In two repetitions the particle sized varied from 134 to 154 nm, and with it the viscosity changed from 1580 to 3060 cps (Brookfield, LVT, spindle 3, 12 rpm).

A textile impregnated with this dispersion (after addition of the antimony penta-oxide dispersion) to a pick up of 25.8% was found to be fire retardant in accordance with the standard cited above. Antimony penta-oxide was added in the form of dispersion, sold under the trade name NyacolA1550, in concentration of 18.5 gr per 100 gr polymeric dispersion Here, a pre-dispersion of PBBMA with the other monomers is first prepared from the PBBMA dispersion described above, mixed with the other monomers and suitable surface active agents, and then this pre-dispersion is polymerized.

Pre-dispersion: To a 1 liter round bottom flask, fitted with mechanical stirrer, 500 gr of the described PBBMA dispersion is added together with 3-8 gr of surfactant combination, made of two surfactants, one being anionic, and the other non-ionic with high HLB of about 14-18. The weight ration between the anionic and non-ionic surfactants should be 2:1. Also added to the dispersion, slowly, with continuous stirring, and in the following order are 1-5 gr acrylic acid, 15-40 gr N-methylol acryl amide (45% solids), 165-200 gr butyl acrylate and 15 gr water. This leads to the formation of a stable pre dispersion that should be stirred for another 15 minutes.

Polymerization process: To a 1.7 liter, 5-neck, round bottom flask, with warming/cooling double glassing jacket, fitted with mechanical stirrer, reflux condenser, thermometer, dropping funnel and Nitrogen inlet, one should add 220 gr water, 0.05-0.5 gr of the non-ionic surfactant used in the combination mentioned above, and 0.5 gr Ammonia. Hot water is to be passed through the jacket, to warm the solution up to 80-82° C. Continuous stirring (200-300 rpm) should be applied. Nitrogen is introduced under the surface of the liquid for 10 min. First initiator solution, made by dissolving 0.5 gr APS in 5 gr water, is to be added, and 5 minutes later, the pre emulsion is to be added through the dropping funnel, drop wise, over 4 hours. Main initiator solution, prepared by dissolving 1-3 gr APS and 0.5 gr ammonia in 40 gr water is added as well, simultaneously with the pre dispersion. Temperature should be kept at 80-82° C. during the procedure. After 4 hours, temperature is to be allowed to raise to 85° C., and the dispersion is stirred for another 45-55 minutes. The temperature is then lowered to 65° C., and solution of 0.5 gr TBHP in 5 gr water is added. After 5 min, solution of 0.3-2 gr Formosul in 5 gr water is added. The dispersion is cooled to room temperature, and 0.5 gr anti-foam and 2 gr biocide should be added with stirring.

Example 3

This example teaches how to obtain a copolymer of the same monomers as in Example 2, however, in the present example, the dispersion obtained has somewhat lower solid content of 41%, and significantly lower viscosity, of only 62 cps (Brookfield, LVT, spindle 1, 60 rpm). The particle size was measured to be 116 nm and the bromine content was 30.6%.

This example uses a PBBMA dispersion as described under example 1 above, and a pre-emulsion with the other monomers. The dispersion, pre-emulsion and main initiator were added all simultaneously.

Pre-emulsion: To a 1 liter round bottom flask, fitted with mechanical stirrer, add 130 gr water and 1-5 gr of a surfactant combination. This combination is like the one used in example 2, but the weight ratio between the anionic and non-ionic surfactants is 4:1, rather than 2:1 used in example 2. After 5-10 min stirring at 250 rpm add slowly, with continuous stirring, and in the following order: 1-5 gr acrylic acid, 15-40 gr N-methylol acryl amide (45% solids), 140-170 gr butyl acrylate and 15 gr water. The stable pre emulsion thus obtained is to be stirred for additional 15 minutes.

Polymerization process: To a 1.7 liter, 5-neck, round bottom flask, with warming/cooling double glassing jacket, fitted with mechanical stirrer, reflux condenser, thermometer, 2 dropping funnels and Nitrogen inlet, add 168 gr water, and 0.5 gr Ammonia. Hot water should be passed through the jacket, to warm the solution up to 80-82° C. Apply continuous stirring (200-300 rpm). Introduce nitrogen under the surface of the liquid for 10 min. Add a first initiator solution, made by dissolving 0.5 gr APS in 3 gr water. After 5 minutes add the pre emulsion through one dropping funnel and 440 gr of PBBMA dispersion, described above, through the second dropping funnel. Add the dispersion and pre-emulsion simultaneously drop wise, over 4 hour. Prepare a main initiator solution by dissolving 1-3 gr APS and 0.5 gr ammonia in 40 gr water, and add them as well, simultaneously with both dispersion and pre emulsion. Temperature must be kept at 80-82° C. during the procedure. After 4 hours, temperature should be raised to 85° C., and the dispersion stirred for another 45-55 min. The temperature should then be lowered to 65° C., and solution of 1-3 gr TBHP in 5 gr water be added.

After 5 min, add solution of 0.3-2 gr Formosul in 5 gr water. Cool the thus obtained dispersion to room temperature, and add with stirring 2 gr Ammonia and 2 gr biocide.

Example 4

Preparation of copolymer of PBBMA, butyl acrylate and acrylic acid. The example allows obtaining a polymeric aqueous dispersion with a solids content of about 40% and bromine content of about 52%, which is also characterized by exceptionally small particle size of 87 nm, with exceptionally low viscosity of 12 cps (Brookfield, LVT, spindle 1, 60 rpm).

PBBMA dispersion: To a 2-liter round bottom flask, fitted with mechanical stirrer, add 450 gr water and 50-80 gr of a dispersing agents combination. This combination should be a 1:1 combination of an anionic and nonionic surfactant. After short mixing, add slowly about 480 gr of commercial PBBMA powder (FR1025M, average particle size of 5-8 micron) and follow it by adding 1 gr biocide. Mix the obtained dispersion for another 10 minutes. Grind the dispersion with High Sheer Homogenizer such as IKA Ultraturax T-50, for 20 min while keeping temp max 30° C. Transfer the dispersion for additional 3 cycles of grinding with pearl mill, such as Dyno mill, until having particle size of 600-1500 mn. Adjust the PH to 7-8.

Solution: To a 1 liter round bottom flask, fitted with mechanical stirrer, add slowly, one by one in the given order 50-100 gr butyl acrylate, 1-5 gr acrylic acid and 1-5 gr of an alkyl aryl sulphonic acid.

Polymerization process: To a 1.7 liter, 5-neck, round bottom flask, with warming/cooling double glassing jacket, fitted with mechanical stirrer, reflux condenser, thermometer, 2 dropping funnels and Nitrogen inlet, add 140 gr water, 1 gr of a nonionic high HLB alkyl phenol based surfactant and 0.6 gr Ammonia. Hot water should be passed through the jacket, to warm the solution up to 80-82° C. Continuous stirring at 200-300 rpm should be applied. Introduce nitrogen under the surface of the liquid for 10 min, and then add a first initiator solution, made by dissolving 0.5 gr APS in 3 gr water. 5 min later, add drop wise, over 5 hours, the solution through one dropping funnel simultaneously with adding through the second dropping funnel a mixture of 700 gr of the PBBMA dispersion described above and 15-40 gr N-Methylol Acryl Amide. Still simultaneously, add a main initiator solution, prepared by dissolving 1.5 gr APS, 1-3 gr nonionic high HLB alkyl phenol based surfactant and 0.5 gr ammonia in 30 gr water. Temperature should be kept at 80-82° C. during the procedure. After 5 hours, temperature should be raised to 85° C., and the dispersion should be mixed for another 45-55 min. The temperature is then lowered to 65° C., and solution of 0.5 gr TBHP in 5 gr water is added. After 5 min, solution of 0.35 gr Formosul in 5 gr water is added. The dispersion is then let to cool to room temperature, and 0.5 gr antifoam and 2 gr biocide are to be added while stirring.

Example 5

Preparation of copolymer of PBBMA, butyl acrylate, 2-ethyl hexyl acrylate and acrylic acid. The example allows obtaining a polymeric aqueous dispersion with a solids content of about 46% and bromine content of 20%, which is also characterized by low Tg value of −12° C. (calculated), particle size of 186 nm, with viscosity of 860 cps (Brookfield, LVT, spindle 3, 12 rpm).

PBBMA dispersion: To a 2-liter round bottom flask, fitted with mechanical stirrer, add 360 gr water and 40-55 gr of a 1:1 combination of low HLB alkyl phenol based nonionic dispersing agent and anionic surfactant. After short stirring, add slowly 490 gr of commercial PBBMA powder (FR1025M, average particle size of 5-8 micron) and 8 gr antifoam, followed by 1 gr biocide. Stir the obtained dispersion for another 10 minutes. Grind the obtained dispersion with High Sheer Homogenizer, such as IKA Ultraturax T-50 for 20 minutes while keeping the temp at maximum 30° C. Transfer the ground dispersion for 3 additional grinding cycles with pearl mill (Dyno mill), until a particle size of 600-1500 nm is obtained. Adjust the PH to 7-8.

Pre-dispersion: To a 1 liter round bottom flask, fitted with mechanical stirrer, add 3-8 gr of surfactant combination, made of two alkyl phenol based surfactants, one being anionic, and the other non-ionic with high HLB of about 14-18. The weight ration between the anionic and non-ionic surfactants should be 2:1. Also add to the dispersion, slowly, with continuous stirring, and in the following order 1-5 gr acrylic acid, 15-40 gr N-methylol acryl amide (45% solids), 140-200 gr butyl acrylate, 140-200 gr 2 ethyl hexyl acrylate and 15 gr water. This leads to the formation of a stable pre-dispersion, that should be stirred for another 15 minutes.

Polymerization process: To a 1.7 liter, 5-neck, round bottom flask, with warming/cooling double glassing jacket, fitted with mechanical stirrer, reflux condenser, thermometer, 2 dropping funnels and Nitrogen inlet, add 202 gr water, 0.05-2 gr of a nonionic high HLB alkyl phenol based surfactant and 0.5 gr Ammonia. Hot water should be passed through the jacket, to warm the solution up to 80-82° C. Continuous stirring at 200-300 rpm should be applied. Introduce nitrogen under the surface of the liquid for 10 min, and then add a first initiator solution, made by dissolving 0.5 gr APS in 3 gr water. 5 min later, add drop wise, over 5 hours, the pre dispersion through one dropping funnel simultaneously with adding through the second dropping funnel 265 gr of the PBBMA dispersion described above. Still simultaneously, add a main initiator solution, prepared by dissolving 1-3 gr APS and 0.5 gr ammonia in 40 gr water. Temperature should be kept at 80-82° C. during the procedure. After 5 hours, temperature should be raised to 85° C., and the dispersion should be mixed for another 45-55 min. The temperature is then lowered to 65° C., and solution of 1-3 gr TBHP in 5 gr water is added. After 5 min, solution of 0.3-2 gr Formosul in 5 gr water is added. The dispersion is then let to cool to room temperature, and 0.5 gr antifoam and 2 gr biocide are to be added while stirring.

Example 6

A PBBMA-alkyl methacrylate copolymer with 68% bromine, viscosity of 20 cps, solid content of 41.5% and particle size of 100 nm.

PBBMA dispersion: Prepare as in the previous example.

Prepare a solution by dissolving 2-8 gr of low HLB nonionic dispersing agent, the same weight of anionic surfactant and 1-4 gr thickening agent in 100 gr Water.

Prepare a semi-final PBBMA dispersion by mixing the above dispersion and solution in 9:1 w/w proportions.

Final Dispersion: To a 1 liter round bottom flask, fitted with mechanical stirrer, add slowly, with continuous stirring, 800 gr of the above semi-final PBBMA dispersion and 0.05-3 gr Allyl Methacrylate.

Polymerization process: To a 1.7 liter, 5-neck, round bottom flask, with warming/cooling double glassing jacket, fitted with mechanical stirrer, reflux condenser, thermometer, dropping funnels and Nitrogen inlet, add 130 gr water, 1-4 gr high HLB nonionic surfactant and 0.6 gr Ammonia. Let hot water pass through the jacket, to warm the solution up to 80-82° C. with continuous stirring at 200-300 rpm. Introduce nitrogen under the surface of the liquid for 10 min. Five minutes later add a first initiator solution, made by dissolving 0.5 gr APS in 3 gr water. Another 5 min later, add the final dispersion through the dropping funnel, drop wise, over 4.5 hour. Add a main initiator solution, prepared by dissolving 1-3 gr APS, 0.1-2 gr high HLB nonionic surfactant and 0.5 gr ammonia in 30 gr water simultaneously with adding both the dispersion and pre emulsion. Keep temperature at 80-82° C. during the procedure. After 4.5 hours, raise the temperature to 85° C., and mix the dispersion for another 45-55 min. Let the temperature cool to 65° C., and add a solution of 1-3 gr TBHP in 5 gr water. After 5 min, add a solution of 0.3-2 gr Formosul in 5 gr water. Let the dispersion cool to room temperature, and add with stirring 0.5 gr antifoam and 2 gr biocide.

Example 7

Another recipe for a copolymer and aqueous dispersion containing it is given in the present example. The polymer obtained by the inventor in accordance with this example contained 50.6% solids, and had a viscosity of 16200 cps (Brookfield, LVT, spindle 4, 12 rpm). The polymer particle size was measured to be 134 nm, and the bromine content was 26.8%.

The polymeric dispersion was applied over various kinds of fabrics, including cotton and polyester. The treated fabrics were tested according to test CFR16/1615. The results were good, such the treated fabrics may be considered as sufficient flame retarded in accordance with said test.

PBBMA dispersion: The same as in Example 1.

Pre-emulsion: To a 1 liter round bottom flask, fitted with mechanical stirrer, add 90 gr water and 5-9 gr Anionic surfactant. After 5-10 min mixing at 250 rpm, add slowly, one by one and while stirring the following ingredients: 1-3 gr acrylic acid, 25-40 gr N-methylol acryl amide (45% solids), 220-290 gr butyl acrylate and 15 gr water. Stir the thus obtained stable pre emulsion for another 15 min.

Polymerization process: To a 1.7 liter, 5-neck, round bottom flask, with warming/cooling double glassing jacket, fitted with mechanical stirrer, reflux condenser, thermometer, 2 dropping funnels and Nitrogen inlet, add 90 gr water, 0.5-3 gr Anionic surfactant and 0.5 gr Ammonia. Pass hot water through the jacket, to warm the solution up to 80-82° C. Apply Continuous stirring at 200-300 rpm. Introduce nitrogen under the surface of the liquid for 10 min. Add a first initiator solution, made by dissolving 0.5 gr APS in 3 gr water. 5 min later, add 8-25 gr of the pre-emulsion described above. Few minutes later, when no change in Temp is observed, add the rest of the pre emulsion through one dropping funnel and through the second dropping funnel add 472 gr of the PBBMA dispersion of example 1, drop wise, over 4 hour. Add a main initiator solution, prepared by dissolving 1-3 gr APS and 0.5 gr ammonia in 40 gr water simultaneously with the dispersion and the pre emulsion. Keep Temperature at 80-82° C. during the procedure. After 4 hours, raise temperature to 85° C., and mix the obtained dispersion for another 45-55 min. Let the temperature drop to 65° C., and add a solution of 1-3 gr TBHP in 5 gr water. After 5 min stirring, add a solution of 0.3-2 gr Formosul in 5 gr water. Cool the obtained dispersion to room temperature, and add with stirring 2 gr Ammonia and 2 gr Biocide.

Example 8

This is another example for an extraordinary non-viscous dispersion obtainable in accordance with the present invention. This polymeric dispersion was applied to various kinds of fabrics, such as cotton and polyester, and tested according to test CFR16/1615. The results were good, such that the treated fabrics may be considered as sufficient flame retarded.

The aqueous dispersion prepared by the inventor in accordance with the present example had 40.1% solid content and a viscosity as low as 10 cps (Brookfield, LVT, spindle 1, 60 rpm). The polymer particle size was measured to be 137 nm, and the polymer bromine content was 43%.

PBBMA dispersion: The same as in Example 4.

Pre-emulsion: To a 1 liter round bottom flask, fitted with mechanical stirrer, add 90 gr water, 5-8 gr of a 2:1 mixture of Anionic surfactant and with Nonionic high HLB surfactant. After 5-10 min mixing at 250 rpm, add slowly, with constant stirring according to the following order 1-4 gr acrylic acid, 15-30 gr N-methylol acryl amide (45% solids), 110-150 gr butyl acrylate and 15 gr water. Stir the stable pre emulsion thus obtained for another 15 min.

Polymerization process: To a 1.7 liter, 5-neck, round bottom flask, with warming/cooling double glassing jacket, fitted with mechanical stirrer, reflux condenser, thermometer, 2 dropping funnels and Nitrogen inlet, add 177 gr water, and 0.55 gr Ammonia. Pass hot water through the jacket to warm the solution up to 80-82° C. Apply Continuous stirring at 200-300 rpm. Introduce nitrogen under the surface of the liquid for 10 min. Add a first initiator solution, made by dissolving 0.5 gr APS in 3 gr water. 5 min later, add the pre emulsion one of the dropping funnels and 492 gr of PBBMA dispersion of example 4 through the other dropping funnel, drop wise, over 5 hours. Add a main initiator solution, prepared by dissolving 1-3 gr APS and 0.5 gr ammonia in 40 gr water simultaneously with both dispersion and pre emulsion. Keep temperature at 80-82° C. during the procedure. After 5 hours, raise the temperature to 85° C., and stir the dispersion for another 45-55 min. Lower the temperature to 65° C., and add a solution of 1-3 gr TBHP in 5 gr water. After 5 min, add a solution of 0.3-2 gr Formosul in 5 gr water. Cool the obtained dispersion to room temperature, and add with stirring 2 gr Antifoam and 2 gr Biocide.

Example 9

Here a copolymer of PBBMA, butyl acrylate, acrylic acid and N-methylol acryl amide is prepared. The inventor obtained in accordance with this example, am aqueous polymeric dispersion having 49.3% solid content and viscosity of 530 cps (Brookfield, LVT, spindle 2, 30 rpm). The polymer was measured to have a particle size of 176 nm and bromine content of 47.2%. This polymeric aqueous dispersion was applied to various kinds of fabrics, such as cotton, polyester, etc, and tested according to test CFR16/1615. The results were good, such that the treated fabrics may be considered as sufficient flame retarded.

PBBMA dispersion: The same as in Example 4.

Solution: To a 1 liter round bottom flask, fitted with mechanical stirrer, add slowly, with constant mixing, by the given order, 60 gr butyl acrylate, 1-3 gr Acrylic Acid and 0.5-1.5 anionic alkyl aryl solphonic acid based surfactant slowly.

Polymerization process: To a 1.7 liter, 5-neck, round bottom flask, with warming/cooling double glassing jacket, fitted with mechanical stirrer, reflux condenser, thermometer, 2 dropping funnels and Nitrogen inlet, add 134 gr water, 1-4 gr nonionic high HLB surfactant and 0.6 gr Ammonia. Pass hot water through the jacket, to warm the solution up to 80-82° C. Stir continuously at 200-300 rpm. Introduce nitrogen under the surface of the liquid for 10 minutes. Add a first initiator solution, made by dissolving 0.5 gr APS in 3 gr water. 5 min later, add the obtained solution through one dropping funnel, and add simultaneously through the other dropping funnel, drop wise, over 5 hours, a mixture of 660 gr of final PBBMA dispersion, described under example 4, and 25-40 gr N-Methylol Acryl Amide. Add a main initiator solution, prepared by dissolving 1-3 gr APS, 0.5-2 gr nonionic high HLB surfactant and 0.5 gr ammonia in 30 gr water, simultaneously with both the dispersion and the pre emulsion. Keep the temperature at 80-82° C. during the procedure. After 5 hours, raise the temperature to 85° C., and the stir the obtained for another 45-55 min. Lower the temperature to 65° C., and add a solution of 1-3 gr TBHP in 5 gr water. After 5 min, add a solution of 0.3-2 gr Formosul in 5 gr water. Cool the dispersion to room temperature, and add with stirring 0.5 gr Antifoam and 2 gr Biocide.

Example 10

This and the following two examples demonstrate another aspect of the present invention, according to which a solution (rather than dispersion or emulsion) of the brominated polymer is first prepared.

In accordance with this example an aqueous dispersion with 48% solid content, and viscosity of 15 cps (Brookfield, LVT, spindle 1, 60 rpm) was prepared. The polymer included therein was made of PBBMA, acrylic acid and N-methylol acryl amide, had a bromine content of 24.3% and the size of the polymeric particles was 950 nm. The obtained polymer had a calculated Tg of 115° C.

PBBMA solution: To a 1 liter round bottom flask, fitted with mechanical stirrer, add 320-350 gr styrene and warm up to 45-50° C. Add 130-180 PBBMA powder (styrene: PBBMA weight ratio 1.8:1) and stir until the obtained solution appears to be clear. Cool the solution to room temperature.

Pre-emulsion: To a 1 liter round bottom flask, fitted with mechanical stirrer, add 204 gr water, 1-4 gr linear anionic surfactant, 3-6 gr non ionic, alcohol Ethoxylated surfactant with HLB value of 15-18, 3-6 gr acrylic acid, 15-30 gr N-methylol acryl amide (45% solids), the above PBBMA solution and 15 gr water. These ingredients should be added slowly, in the given order, with continuous stirring. Stir the stable pre emulsion obtained in this manner for another 15 min.

Polymerization process: To a 1.7 liter, 5-neck, round bottom flask, with warming/cooling double glassing jacket, fitted with mechanical stirrer, reflux condenser, thermometer, dropping funnel and Nitrogen inlet, add 204 gr water, 0.5 gr sodium carbonate and 0.5 gr sodium bicarbonate. Pass hot water through the jacket, to warm the solution up to 80-82° C. Stir continuously at 200-300 rpm. Introduce nitrogen under the surface of the liquid for 10 minutes. Add a first initiator solution, made by dissolving 0.5 gr APS in 5 gr water. 5 min later, add the pre emulsion obtained this way through the dropping funnel, drop wise, over 4 hours. Add a main initiator solution, prepared by dissolving 1-3 gr APS and 1 gr ammonia in 40 gr water simultaneously with adding the pre emulsion. Keep the temperature at 80-82° C. during the procedure. After 4 hours, raise the temperature to 86° C., and stir the obtained dispersion for another 45-55 min. Lower the temperature to 70° C., and add a solution of 1-3 gr TBHP in 4 gr water. After 5 min, add a solution of 0.5-2 gr Formosul in 8 gr water. Cool the obtained dispersion to room temperature, and add 2 gr Ammonia and 2 gr biocide while stirring.

A polymer obtained in accordance with this example was applied to various kinds of fabrics such as cotton and polyester, and tested according to test CFR16/1615. The results were good and the substrates may be considered as sufficient flame retarded.

Example 11

The polymer obtained in the present example is similar in monomer content to that obtained in the preceding example, but includes also butyl acrylate, which makes it more hydrophobic and lowers its Tg value. Please note also the difference in the order according to which the components are added to the pre-emulsion. The aqueous dispersion obtained in accordance with this example had 50.8% solids content and viscosity of 31 cps (Brookfield, LVT, spindle 1, 60 rpm). The polymer had a particle size of 803 mn and bromine content of 20.5%. The calculated Tg of the obtained polymer was 59 C.

PBBMA solution: Prepare according to Example 10.

Pre-emulsion: To a 1 liter round bottom flask, fitted with mechanical stirrer, add slowly, with stirring and by the following order 204 gr water, 1-4 gr linear anionic surfactant, 3-6 gr non ionic, high HLB alcohol Ethoxylated surfactant, 3-6 gr acrylic acid, 15-30 gr N-methylol acryl amide (45% solids), 120-160 gr butyl acrylate, the above PBBMA solution and 15 gr water. Stir the stable pre emulsion obtained this way for another 15 min.

Polymerization process: To a 1.7 liter, 5-neck, round bottom flask, with warming/cooling double glassing jacket, fitted with mechanical stirrer, reflux condenser, thermometer, dropping funnel and Nitrogen inlet, add 180 gr water, 0.6 gr ammonia and 1 gr sodium bicarbonate. Pass hot water through the jacket, to warm the solution up to 80-82° C. Stir Continuously at 200-300 rpm. Introduce nitrogen under the surface of the liquid for 10 minutes. Add a first initiator solution, made by dissolving 0.5 gr APS in 5 gr water. 5 min later, add the pre emulsion through the dropping funnel, drop wise, over 4 hours. Add also a main initiator solution, prepared by dissolving 1.7-2.7 gr APS and 1 gr ammonia in 40 gr water, simultaneously with adding the pre emulsion. Keep the temperature at 80-82° C. during the procedure. After 4 hours. Raise the temperature to 86° C., and stir the dispersion for another 45-55 min. Lower the temperature to 70° C., and add a solution of 1-3 gr TBHP in 4 gr water. After 5 min, add a solution of 0.5-2 gr Formosul in 8 gr water. Cool the dispersion to room temperature, and add with stirring 2 gr Ammonia and 2 gr biocide.

Example 12

This example shows that antimony oxide may be added to the aqueous dispersion during the polymerization process, and it may also be added into the pre-emulsion before polymerization.

A polymer that was prepared in accordance with the present invention had 51.9% solid content, and viscosity of 2250 cps (Brookfield, LVT, spindle 4, 12 rpm). The polymer showed particle size of 138 nm, bromine content of 22.5%, and had a calculated Tg of 116° C.

PBBMA solution: Prepare as detailed in Example 10.

Pre-emulsion: To a 1 liter round bottom flask, fitted with mechanical stirrer, add slowly, one by one, in accordance with the given order, and with constant stirring 204 gr water, 3-6 gr anionic surfactant, 1-4 gr acrylic acid, 20-35 gr N-methylol acryl amide (45% solids), 75-90 gr antimony pentaoxide dispersion(Nyacole A1550PH7) the above PBBMA solution and 15 gr water. Stir the stable pre emulsion thus obtained for another 15 minutes.

Polymerization process: To a 1.7 liter, 5-neck, round bottom flask, with warming/cooling double glassing jacket, fitted with mechanical stirrer, reflux condenser, thermometer, dropping funnel and Nitrogen inlet, add 122 gr water, 75-90 gr antimony pentaoxide dispersion (Nyacole A1550PH7), 0.5-3 gr anionic surfactant and 0.5 gr sodium bicarbonate. Pass hot water through the jacket, to warm the solution up to 80-82° C. Stir continuously at 200-300 rpm. Introduce nitrogen under the surface of the liquid for 10 min. Add a first initiator solution, made by dissolving 0.4 gr APS in 5 gr water. 5 minutes later, add the pre emulsion through the dropping funnel, drop wise, over 4 hours. Add a main initiator solution, prepared by dissolving 1-3 gr APS and 1 gr ammonia in 35 gr water simultaneously with the addition of the pre emulsion. Keep the temperature at 80-82° C. during the procedure. After 4 hours, raise the temperature to 86° C., and stir the dispersion for another 45-55 min. Lower the temperature to 70° C., and add a solution of 1-3 gr TBHP in 4 gr water. After 5 min, add a solution of 0.5-2 gr Formosul in 8 gr water. Cool the obtained dispersion to room temperature, and add 2 gr Ammonia and 2 gr biocide while stirring.

The invention claimed is:
1. A polymer, comprising:
(i) at least one non-brominated comprising a specialty monomer; and
(ii) at least one brominated monomer having the structure A-B-C, wherein
A is a phenyl substituted with 3-5 bromine atoms,
B is a $C_1$ to $C_4$ alkyl optionally substituted with 1 to 8 bromine atoms, and
C is an acrylic or methacrylic group,
wherein the polymer comprises a bromine content of 20% (w/w) or more, and the polymer comprises at least one non-brominated monomer having a Tg lower than 0° C. or the polymer has a Tg lower than 0° C., and
wherein said specialty monomer is selected from sodium salt of 2-acrylamido-2-methyl propane sulphonic acid, betal-carboxymethyl acrylate, ammonium allyloxy-polyethoxy(10)sulphate, laurethoxy(23)methacrylate, laurethoxy(25)methacrylate, allyl methacrylate, and hydroxyl ethyl methacrylate, glycidyl methacrylate, ammonium salt of α-sulfo-ω-[1-(Alkoxy)methyl-2-(2-propenyloxy)ethoxy]-ω-hydro-poly(oxy-1,2,-ethanediyl), ammonium salt of α-[1-(Alkoxy)methyl-2-(2-propenyloxy)ethoxy]-ω-hydro-poly(oxy-1,2,-ethanediyl), ditrimethylo propane tetraacrylate, ethoxilated trimetholopropane triacrylate, and trimethylo propane acrylate.
2. A mixture comprising a
polymer according to claim 1 and
more than one surface active agent.
3. The mixture according to claim 2, further comprising antimony oxide.
4. An aqueous dispersion, comprising:
a polymer comprising a bromine-containing monomer having the structure A-B-C, wherein
A is a phenyl, substituted with 3-5 bromine atoms,
B is a $C_1$ to $C_4$ alkyl optionally substituted with 1 to 8 bromine atoms, and
C is an acrylic or methacrylic group; and
at least one non-brominated monomer,
wherein the polymer comprises a bromine content of at least 20% (w/w) and the dispersion comprises a solid content of at least 40%.
5. The aqueous dispersion according to claim 4, wherein said phenyl is substituted with 5 bromine atoms.
6. The aqueous dispersion according to claim 4, wherein said alkyl is $CH_2$.
7. The aqueous dispersion according to claim 4, wherein said brominated monomer is PBBMA.
8. The aqueous dispersion according to claim 4, wherein said polymer comprises:
at least one non-brominated monomer; and
at least one brominated monomer having the structure A-B-C, wherein
A is a phenyl substituted with 3-5 bromine atoms,
B is a $C_1$ to $C_4$ alkyl optionally substituted with 1 to 8 bromine atoms, and
C is an acrylic or methacrylic group,
wherein the polymer comprises a bromine content of 20% (w/w) or more, and the polymer comprises at least one non-brominated monomer having a Tg lower than 0° C. or the polymer has a Tg lower than 0° C.
9. The aqueous dispersion according claim 4, further comprising at least two different surface active agents.
10. The aqueous dispersion according to claim 9, wherein one or more of said surface active agents is an alkyl aryl.
11. The aqueous dispersion according to claim 4, further comprising antimony oxide.
12. The aqueous dispersion according to claim 4, consisting essentially of solid particles in aqueous solution, wherein the size of said solid particles is less than 2000 nm.
13. The aqueous dispersion according to claim 12, wherein said size is between 50 and 1000 nm.
14. The aqueous dispersion according to claim 13, wherein said size is between 80 and 400 nm.
15. The aqueous dispersion according to claim 4, wherein said polymer has a density of 1.2 g/cc or more.
16. The aqueous dispersion according to claim 4, wherein said polymer has a molecular weight of 500,000 and above.
17. The aqueous dispersion according to claim 16, wherein said polymer has a molecular weight of 1,000,000 or above.
18. The aqueous dispersion according to claim 4, which is stable for at least six months in −7-35° C. with no direct sunlight.
19. The aqueous dispersion according to claim 4, which is stable for at least six months in 5 to 35° C. with no direct sunlight.
20. A fire-retardant product, comprising antimony oxide and a polymer comprising at least one bromine-containing monomer and at least one non-brominated monomer, a textile, said textile being printed, sprayed, or impregnated with an aqueous dispersion, comprising:
antimony oxide; and
a polymer comprising
a bromine-containing monomer having the structure A-B-C, wherein
A is a phenyl, substituted with 3-5 bromine atoms,
B is a $C_1$ to $C_4$ alkyl optionally substituted with 1 to 8 bromine atoms, and
C is an acrylic or methacrylic group; and
at least one non-brominated monomer;
wherein the polymer comprises a bromine content of at least 20% (w/w) and the aqueous dispersion comprises a solid content of at least 40%.
21. The product according to claim 20, wherein said non-brominated monomer is hydrophobic.
22. The product according to claim 21, wherein said hydrophobic monomer is selected from the group consisting of butyl Acrylate, 2-ethyl hexyl acrylate, styrene, and styrene derivatives.

23. A method for fabricating a fire-retardant textile, comprising printing, spraying or impregnating a textile with an aqueous dispersion, according to claim 4.

24. A method for improving the hydrophobicity of a textile, comprising printing, spraying, or impregnating said textile with an aqueous dispersion according to claim 4.

25. The method according to claim 24, wherein the polymer dispersed in said dispersion comprises a hydrophobic non-brominated monomer.

26. The method according to claim 23, wherein said hydrophobic non-brominated monomer is selected from the group consisting of butyl Acrylate, 2-ethyl hexyl acrylate, and styrene.

27. A method for obtaining an aqueous dispersion of a co-polymer, comprising:
providing a second monomer that is at least partially dissolved in a first monomer comprising a brominated aromatic compound, and
polymerizing the first polymer and the second monomer in the presence of water and surfactants to obtain an aqueous dispersion of a co-polymer.

28. The method according to claim 27, wherein said brominated aromatic compound has the structure A-B-C, wherein A is a phenyl, substituted with 3-5 bromine atoms, B is a $C_1$ to $C_4$ alkyl, optionally substituted with 1 to 8 bromine atoms, and C is an acrylic or methacrylic group.

29. The method according to claim 28 wherein the phenyl in said first monomer is substituted with 5 bromine atoms.

30. The method according to claim 28, wherein the alkyl in said first monomer is $CH_2$.

31. The method according to claim 27, wherein said first monomer is PBBMA.

32. The method according to claim 27, wherein said first monomer is a bromostyrene or a derivative thereof.

33. The method according to claim 27, wherein said second monomer is styrene or a styrene derivative.

34. The method according to claim 27, wherein the amount of said water is sufficient to obtain a dispersion having at least 40% solid content.

35. The method according to claim 27, wherein the ratio between said first monomer and non-brominated monomers is sufficient to obtain a polymer has having at least 20% (w/w) bromine content.

36. The method according to claim 27, wherein at least one of said surfactants is reactive, and the obtained polymer comprises said first monomer, said second monomer, and said reactive surfactant.

37. The method according to claim 27, wherein said first and second monomer react with at least one other monomer, such that the polymer obtained comprises said first monomer, said second monomer, and said at least one other monomer.

38. The method according to claim 37, wherein said at least one other monomer is a specialty monomer.

39. The method according to claim 38, wherein said specialty monomer is selected from monomers that are cross-linking, surface active, and adhesion promoting.

40. The method according to claim 38, wherein said specialty monomer is selected from the group consisting of N-(Hydroxymethyl)acrylamide, sodium salt of 2-acrylamido-2-methyl propane sulphonic acid, betal-carboxymethyl acrylate, ammonium allyloxypolyethoxy(10)sulphate, laurethoxy(23)methacrylate, laurethoxy(25) methacrylate, allyl methacrylate, and hydroxyl ethyl methacrylate, glycidyl methacrylate, ammonium salt of α-sulfo-ω-[1-(Alkoxy)methyl-2-(2-propenyloxy) ethoxy]-ωhydro-poly(oxy-1,2,-ethanediyl), ammonium salt of α-[1-(Alkoxy)methyl-2-(2-propenyloxy)ethoxy]-ω-hydro-poly(oxy-1,2,-ethanediyl).

41. The method according to claim 37, wherein said at least one other monomer is selected from the group consisting of acrylic monomers and vinyl acetate.

42. The method according to claim 41, wherein said acrylic monomer is selected from the group consisting of acrylamide, acrylic acid, acrylonitrile, butyl acrylate, ethyl acrylate, 2-ethyl hexyl acrylate, and methyl methacrylate.

43. The method according to claim 37, wherein said at least one other monomer is of the formula $R_1CH=CR_2C(O)A$, wherein
A is selected from the group consisting of $OR_3$, $NR_3R_4$, and CN; and
$R_1$ and $R_2$ are each independently selected from H and alkyl, said alkyl being linear or branched, and
$R_3$ and $R_4$ are each independently selected from H, alkyl, alkenyl, alkoxy, polyalkoxy, alkanol, or ether, each of which may be linear or branched, substituted or unsubstituted.

44. The method according to claim 43, wherein the carbon-containing R groups have between 1 and 15 carbons.

45. The method according to claim 44, wherein the alkyl groups have between 1 and 4 carbon atoms.

46. The method according to claim 27, comprising:
(i) dissolving said first monomer in a first liquid to obtain a solution, wherein said first liquid includes said second monomer optionally together with surfactants;
(ii) mixing said solution with water and optionally also with surfactants to obtain a stable emulsion comprising water, surfactants, and said first monomer; and
(iii) reacting said stable emulsion with an initiator to obtain an aqueous dispersion of a co-polymer containing at least said first monomer and said second monomer.

47. The method according to claim 46, wherein said first liquid does not comprise surfactants and in (ii) said solution is mixed with water and surfactants.

48. A polymer, comprising:
(i) at least one non-brominated monomer comprising a specialty monomer; and
(ii) at least one brominated monomer having the structure A-B-C, wherein
A is a phenyl substituted with 3-5 bromine atoms,
B is a $C_1$ to $C_4$ alkyl optionally substituted with 1 to 8 bromine atoms, and
C is an acrylic or methacrylic group,
wherein the polymer comprises a bromine content of at least 20% (w/w), and
wherein said specialty monomer is selected from the group consisting of sodium salt of 2-acrylamido-2-methyl propane sulphonic acid, betal-carboxymethyl acrylate, ammonium allyloxypolyethoxy(10)sulphate, laurethoxy(23)methacrylate, laurethoxy(25) methacrylate, allyl methacrylate, and hydroxyl ethyl methacrylate, glycidyl methacrylate, ammonium salt of α-sulfo-ω-[1-(Alkoxy)methyl-2-(2-propenyloxy) ethoxy]-ω-hydro-poly(oxy-1,2,-ethanediyl), ammonium salt of α-[1-(Alkoxy)methyl-2-(2-propenyloxy)ethoxy]-ω-hydro-poly(oxy-1,2,-ethanediyl), ditrimethylo propane tetraacrylate, ethoxilated trimetholopropane triacrylate, and trimethylo propane acrylate.

* * * * *